Patented Aug. 3, 1954

2,685,590

UNITED STATES PATENT OFFICE 2,685,590

ACYLATED ANTHRAQUINONE DYESTUFFS

Klaus Weinand, Leverkusen, Germany, assignor to Farbenfabriken Bayer Aktiengesellschaft, Leverkusen, Germany, a corporation of Germany No Drawing. Application August 26, 1950, Serial No. 181,704

Claims priority, application Great Britain September 2, 1949

6 Claims. (Cl. 260—372)

The present invention relates to new anthraquinone dyestuffs.

The dyestuffs produced from amino halogen anthraquinone sulfonic acids and monoacetyl diamino benzene are known to be valuable acid dyestuffs for dyeing wool. They are readily soluble and display good levelling properties.

The object of the present invention is to provide new acid wool dyestuffs which are more readily soluble and which display still better leveling properties.

The new acid wool dyestuffs according to the present invention are obtained by reacting 1-amino - 4 - bromo - anthraquinone - sulfonic acids which may carry a further substituent, for instance acetylamino or sulfodimethylamide groups, in one of the positions 5 to 8, with an m- or p-diamino benzene wherein one amino group is acylated with glycolic acid. The said 1-amino-4-bromo-anthraquinone-sulfonic acids may carry the sulfonic acid group in one of the positions 2 or 5 to 8. When the sulfonic acid group stands in one of the positions 5 to 8, the amino group of the 1 - amino - bromo - anthraquinonesulfonic acid may be substituted by a lower alkyl group, for instance methyl, ethyl, propyl, isopropyl, cyclohexyl. Suited 1 - amino - 4 - bromo-anthraquinone-sulfonic acids are for instance 1-amino - 4 - bromo - anthraquinone - 2 - sulfonic acid, 1 - amino - 4 - bromo - 5 - acetyl - amino anthraquinone - 2 - sulfonic acid, 1 - amino - 4 - bromo - 6 - sulfodimethylamide - anthraquinone - 2 - sulfonic acid, 1 - amino - 4 - bromo - 7 - sulfodimethylamide - anthraquinone - 2 - sulfonic acid, 1 - isopropyl - amino - 4 - bromo-anthraquinone - 6 - sulfonic acid, 1 - cyclohexyl-amino - 4 - bromo - anthraquinone - 6 - sulfonic acid.

The new dyestuffs have the general formula

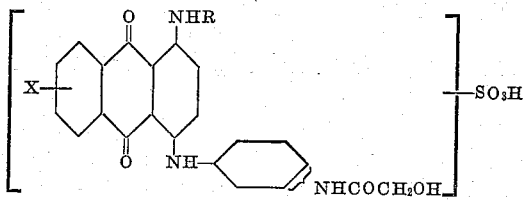

R being hydrogen or a lower alkyl group, for instance methyl, ethyl, propyl, isopropyl and cyclohexyl, X being hydrogen, aminoacetyl or sulfodimethylamide. The SO₃H group may be linked in one of the positions 2 or 5 to 8 of the anthraquinone nucleus, and the NHCOCH₂OH residue may be linked in the meta or para position of the phenyl nucleus.

In the following two dyestuffs are mentioned which are distinguished by especially good dyeing properties as compared with the hitherto known dyestuffs.

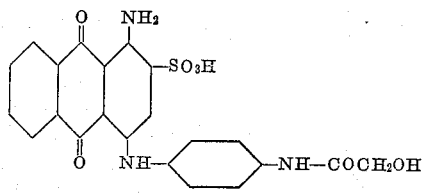

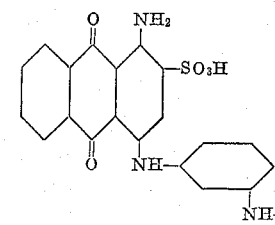

The said diamino benzenes acylated with glycolic acid may be produced, for instance, by treating ω-chloro-acetanilides with basic agents, whereby the Cl-atom is replaced by a hydroxyl group, and by nitrating and reducing the acylated nitro compound thus obtained, or by treating ω-chloro-acetyl nitroanilides with alkaline agents and converting the acylated nitroanilides into the amino compounds by reduction.

It is also possible to manufacture the said diamino benzenes acylated with glycolic acid by reacting glycolide or polyglycolide with aniline or nitroaniline or their substitution products whereby glycolic acid anilides or glycolic acid nitroanilides are obtained. Therefrom the desired glycolic acid diamino benzenes are obtained in the same manner as hereinbefore described.

The following examples illustrate the invention without restricting it thereto, the parts being by weight.

Example 1

20 parts of the sodium salt of 1-amino-4-bromo-anthraquinone-2-sulfonic acid, 15 parts of sodium bicarbonate, 15 parts of 1-amino-4-glycolic acid aminobenzene, 0.5 parts of cuprous chloride are added to 200 parts of water and kept at 60° C. for several hours.

The dyestuff separated during the reaction in the form of blue needles is sucked off and washed with a 5% common salt solution. The dyestuff is a blue powder which dissolves in concentrated sulfuric acid with a blue green coloration and which is readily soluble in water and also in acidified water. It dyes wool from an acid bath in clear greenish blue shades. The dyeings display excellent levelling properties.

When using instead of 1-amino-4-glycolic acid aminobenzene the corresponding 1-amino-3-glycolic acid aminobenzene and processing in the same manner, a dyestuff is obtained which dyes wool in reddish blue shades.

*Example 2*

15 parts of the sodium salt of 1-hexahydroanilido - 4 - bromo - anthraquinone - 6 -sulfonic acid, 15 parts of 1 - amino - 4 - glycolic acid aminobenzene, 10 parts of sodium bicarbonate, 1 part of cuprous chloride are added to 300 parts of water and stirred at 80° C. until the violet colored starting product has disappeared and the reaction product formed is detectable only under the microscope in the form of green crystals which are then sucked off and washed with dilute common salt solution until the washings are colorless. The dry dyestuff is a green powder which dissolved in water with a clear green coloration and dyes wool from the acid bath in bright green shades. The dyeings display excellent levelling properties.

*Example 3*

On following the procedure of Example 2, however, replacing 1-hexahydroanilido-4-bromo-anthraquinone-2-sulfonic acid by the same amount of 1 - isopropylamino - 4 - bromo - anthraquinone - 2 - sulfonic acid a dyestuff with similar properties as described in the preceding example is obtained.

*Example 4*

20 parts of the sodium salt of 1-amino-4-bromo - 6 - sulfodimethylamide - anthraquinone - 2 - sulfonic acid, 15 parts of sodium bicarbonate, 15 parts of 1-amino-4-glycolyl aminobenzene, 0.5 part of cuprous chloride are added to 200 parts of water and kept at 60° C. for several hours. The greenish blue needles separated during the reaction are sucked off and washed with a 5% common salt solution. The dyestuff obtained is a greenish blue powder, which is readily soluble in water and also in acidified water with a greenish blue coloration. It dyes wool from an acid bath in clear greenish blue shades which are somewhat greener than those of the dyestuff according to Example 1. The dyeings display excellent levelling properties.

When using in the foregoing instead of 1-amino - 4 - bromo - 6 - sulfodimethylamide-anthraquinone - 2 - sulfonic acid 1 - amino - 4-bromo - 5 - acetylamino - anthraquinone - 2-sulfonic acid, a dyestuff is obtained showing similar shades and similar properties.

I claim:
1. The new dyestuffs of the general formula

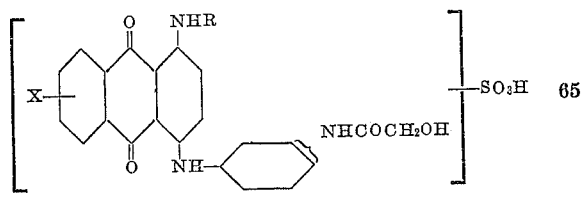

R being a radical selected from the group consisting of hydrogen, methyl, ethyl, propyl, isopropyl and cyclohexyl, X being a substituent selected from the group consisting of hydrogen, acetylamino and sulfodimethylamide, the —SO₃H group being linked in one of the positions 2, 5, 6, 7 and 8 of the anthraquinone nucleus, and the NHCOCH₂OH residue being linked in one of the positions meta and para of the phenyl nucleus.

2. The new dyestuff of the formula

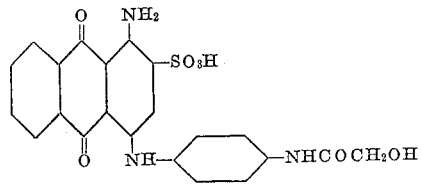

3. The new dyestuff of the formula

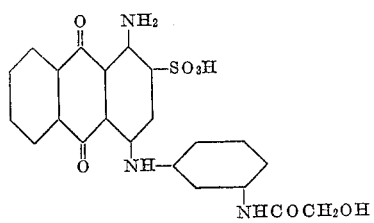

4. The new dyestuff of the formula

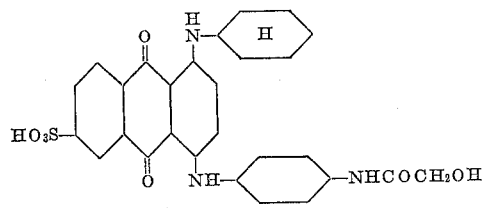

5. The new dyestuff of the formula

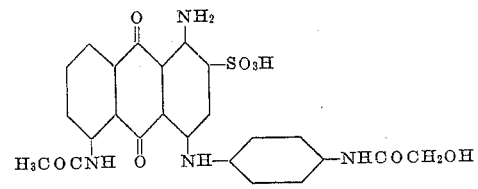

6. The new dyestuff of the formula

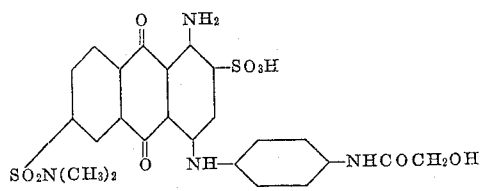

References Cited in the file of this patent

UNITED STATES PATENTS

| Number | Name | Date |
| --- | --- | --- |
| 1,927,125 | Kalischer et al. | Sept. 19, 1933 |